United States Patent [19]

Nowak et al.

[11] 3,857,812

[45] Dec. 31, 1974

[54] UNSATURATED POLYESTER COMPOSITIONS AND THERMOSET ARTICLES PREPARED THEREFROM

[75] Inventors: Robert M. Nowak; Thomas O. Ginter, both of Midland, Mich.

[73] Assignee: The Dow Chemical Company, Midland, Mich.

[22] Filed: June 2, 1972

[21] Appl. No.: 259,285

Related U.S. Application Data

[63] Continuation-in-part of Ser. No. 17,947, March 9, 1970, Pat. No. 3,674,893, which is a continuation-in-part of Ser. No. 812,326, April 1, 1969, abandoned.

[52] U.S. Cl. .............................. 260/40 R, 260/862
[51] Int. Cl. ......................... C08d 9/08, C08f 43/08
[58] Field of Search .......................... 260/862, 40 R

[56] References Cited
UNITED STATES PATENTS

| | | | |
|---|---|---|---|
| 2,609,353 | 9/1952 | Rubens et al. | 260/862 |
| 3,231,634 | 1/1966 | Wismer | 260/862 |
| 3,231,635 | 1/1966 | Holden et al. | 260/880 |
| 3,503,921 | 3/1970 | Souza et al. | 260/40 |
| 3,577,478 | 5/1971 | Thorpe | 260/862 |
| 3,620,900 | 11/1971 | Williger | 161/162 |

FOREIGN PATENTS OR APPLICATIONS

| | | | |
|---|---|---|---|
| 1,321,737 | 11/1963 | France | 260/862 |
| 1,166,467 | 3/1964 | Germany | 260/862 |
| 997,929 | 7/1965 | Great Britain | 260/862 |
| 1,015,236 | 12/1965 | Great Britain | 260/862 |

Primary Examiner—Melvin Goldstein
Assistant Examiner—E. A. Nielsen
Attorney, Agent, or Firm—H. L. Aamoth

[57] ABSTRACT

Stable compositions are prepared from a mixture of an unsaturated polyester resin (containing a copolymerizable monomer) and certain polydiene rubbers such as polybutadiene having an inherent viscosity of about 0.75 to 2 deciliters/gram or a diene copolymer such as butadiene/styrene having an inherent viscosity of about 0.3 to 2 deciliters/gram. When the inherent viscosity is about 1.2 or higher, it has been found necessary to add at least 15 parts of an inert filler per 100 parts of resin and rubber. Thermoset articles prepared from these compositions have improved impact resistance, smooth surfaces (low profile), paintability and uniformity of pigmentation.

30 Claims, No Drawings 3,857,812

UNSATURATED POLYESTER COMPOSITIONS AND THERMOSET ARTICLES PREPARED THEREFROM

REFERENCES

This application is a continuation-in-part of our copending application Ser. No. 17,947 filed on Mar. 9, 1970, now U.S. Pat. No. 3,674,893 which was a continuation-in-part of Ser. No. 812,326 filed on Apr. 1, 1969 and now abandoned.

BACKGROUND OF THE INVENTION

The subject matter of this invention broadly relates to reinforced plastics having impact resistance, uniformity of pigmentation, smooth surfaces (low profile) and good paintability. More specifically, it relates to unsaturated polyester compositions containing certain polydiene rubbers and thermoset articles prepared therefrom.

Brittleness in reinforced plastics is a serious problem and a practical deterrent to their use in the manufacture of a variety of articles, such as car fenders, etc. where the highest possible impact resistance is essential. Currently, some manufacturer specifications for reverse impact properties make it difficult for most commercially available resins to be approved for such uses. In addition other factors are of prime importance, (1) the resin should be capable of providing the smoothest possible surface to minimize the costs of surface preparation (sanding, etc.) for painting, (2) paint should adhere well to the molded article and (3) the resin should be capable of producing uniformly pigmented (non-mottled appearance) articles.

Attempts have been made to improve the surface properties (low profile characteristics) by incorporating into a resin such as an unsaturated polyester, a thermoplastic such as polymethyl methacrylate or polystyrene. Improvements in surface smoothness may be obtained, but paintability and/or impact strength are not improved. In addition such resins pigment poorly and at best only light pastel colors have been possible. Attempts to prepare dark, molded colors have not been successful.

U.S. Pat. No. 3,231,634 proposes to add small amounts of a low molecular weight polydiene to an unsaturated polyester resin to reduce pitting, cracking and crazing of the molded article. However, such compositions do not reduce cracking and crazing any better than the addition of an equivalent amount of polystyrene or polymethyl metharcrylate. None of these additives overcome the brittleness of the reinforced plastics part as measured by the reverse impact test.

German Pat. No. 1,166,467 also proposes to add small amounts of low molecular polybutadiene to prevent shrinkage upon curing, but low molecular weight polybutadiene does not provide improvements in impact resistance.

This invention relates to resin compositions which provide improvements in one or more of the properties of impact strength, stability, paintability, surface smoothness and uniformity of pigmentation in reinforced molded articles prepared therefrom.

SUMMARY OF THE INVENTION

Accordingly, the improvements and benefits of this invention are obtained from thermosettable compositions which comprise a mixture of about 85 to 95 weight percent of a polymerizable resin and about 15 to 5 weight percent of certain polydiene rubbers. The resin contains about 25 to 70 weight percent of an unsaturated polyester resin and about 75 to 30 weight percent of a copolymerizable monomer such as styrene.

Polydiene rubbers include (1) polymers of conjugated dienes (homopolymers or copolymers of said dienes) having an inherent viscosity of at least about 0.75 deciliters/gm and (2) copolymers of conjugated dienes and at least one other copolymerizable monomer different from said diene having at least about 30 weight percent of said diene and an inherent viscosity of at least 0.3 deciliters/gm. The viscosity of the polydiene rubbers may range up to about 1.2 deciliters/gm in the absence of an inert filler and may be extended up to about 2 deciliters/gm in the presence of at least about 15 parts of an inert filler per 100 parts of resin and rubber. Preferably, the polydiene rubber is a block copolymer of a diene and an alkenyl aromatic monomer such as a butadiene/styrene block copolymer.

The compositions are combined with reinforcing materials and molded (cured) into articles exhibiting one or more of the improved properties.

DETAILED DESCRIPTION

Different uses place different demands on the physical and other properties of materials, especially plastics, but frequently changes which might be made to improve one property are made at the expense of other properties. Therefore it was quite unexpected and surprising that the addition of certain polydiene rubbers to unsaturated polyester resins provides improvements in impact strength, surface smoothness, uniformity of pigmentation and paintability of reinforced plastic articles while maintaining good physical properties.

Essential to the invention is the choice of the polydiene rubber. The polymer of a conjugated diene (homopolymer) and polymer of a mixture of conjugated diene (copolymers) are referred to collectively herein as polymers of a conjugated diene and to be effective they should have an inherent viscosity of at least about 0.75 deciliters/gm (a molecular weight by light scattering measurements of about 55,000). The viscosity may range up to about 1.2 deciliters/gm when no filler is present and may be extended up to about 2 deciliters/gm when at least 15 parts of filler are present.

Conjugated diene monomers include butadiene, isoprene, chloroprene, the various halo and lower alkyl substituted derivatives thereof and like monomers. Mixtures of said diene monomers are frequently used to impart certain desired properties to the polydiene rubbers.

Other useful polydiene rubbers include copolymers of a conjugated diene and at least one other copolymerizable monomer different from said diene having at least 30, and preferably at least 40, weight percent of said diene and an inherent viscosity of at least 0.3, preferably at least 0.5, deciliters/gm (a molecular weight of about 15,000 to 20,000). Without filler the viscosity may range up to 1.2 deciliters/gm and with filler present stable compositions may be prepared with rubbers up to 2 deciliters/gm. Preferably, the proportions of diene range up to about 80 percent and more, preferably up to about 70 percent with the balance to make 100 percent of said different monomer.

Polydiene rubbers employed in this invention may be random, graft and block polymers of which a wide variety are commercially available or readily prepared by known polymerization methods. Greatly preferred are the block copolymers of about 40 to 70 weight percent of a conjugated diene and about 60 to 30 weight percent of an alkenyl aromatic monomer. Mixtures of each of these classes of monomers may be employed within the above proportions.

Copolymerizable monomers useful with said diene monomers include nitrile monomers such as acrylonitrile, methacrylonitrile and the like and alkenyl aromatic monomers such as styrene, $\alpha$-methyl styrene, vinyl toluene, the halo and alkyl substituted styrenes such as chlorostyrene or t-butyl styrene. Preferred copolymers include styrene-butadiene copolymers and especially di- and tri-block copolymers thereof.

The unsaturated polydiene rubbers of this invention may be prepared by a variety of well known procedures, and since this invention is concerned with the utilization of said rubbers and not their preparation, no detailed description thereof is needed. Many textbooks and patents are readily available which can be consulted for such preparative methods, such as the chapter on butadiene polymers and copolymers by W. Saltman in "Encyclopedia of Polymer Science and Technology," Vol. 2, Interscience Publishers, 1965.

An important feature of this invention relates to the stability of the compositions. Mixtures such as those in U.S. Pat. No. 3,231,634 are difficult to maintain as a uniform mixture without phase separation occurring before the article can be molded. According to this invention compositions of improved stability may be prepared which may be readily molded without phase separation occurring by utilizing therein a polydiene rubber having the previously described viscosity limits.

It has been found that improvement in impact resistance appears to be related to molecular weight of the polydiene rubber. Consequently, higher molecular weight polydiene rubbers when used at the lowest concentration show greater improvement in impact resistance than the lower molecular weights.

Advantageously it has been found that the viscosity range can be extended upward to about 2 deciliters/gram if the system also contains at least about 15 parts of an inert filler such as clay and the like per 100 parts of resin and rubber. This is of particular significance because thermosettable resin systems are usually formulated with such fillers in commercial use in order to impart certain properties such as weatherability, etc. and for reason of economics.

Inherent viscosity is defined as follows:

$$\eta \text{ inh} = 2.303 \log_{10} \eta_r/C, \text{ where}$$

$\eta_r = \eta/\eta_o$, and
$\eta_o$ = time for solvent and
$\eta$ = time for a solution of 0.15 gm of polymer/100 ml of toluene.
$C$ = concentration
The viscosity units are in deciliters/gram.

The unsaturated thermosettable resin comprises from 25 to 70 weight percent of an unsaturated polyester and from 75 to 30 weight percent of a copolymerizable monomer.

Generally, in the preparation of suitable polyesters, an ethylenically unsaturated dicarboxylic acid such as maleic acid, fumaric acid, itaconic acid or the like is interesterfied with an alkylene glycol or polyalkylene glycol having a molecular weight of about 1,000 to 8,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$- unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 2 to 10 percent.

These unsaturated polyesters may be generally prepared by heating a mixture of the polyhydric alcohol with the dicarboxylic acid or anhydride in the proper molar proportions at elevated temperatures, usually at about 150° to 225°C for a period of time ranging from about 5 to 15 hours. Polymerization inhibitors such as t-butyl catechol may be advantageously added. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride. Further description of these well known resins is unnecessary herein.

A variety of copolymerizable monomers are available and suitable and include alkenyl aromatic monomers, alkyl esters of acrylic and methacrylic acid, vinyl acetate, acrylonitrile, diallyl maleate, diallylphthlate, acrylic and methacrylic acid, and the like and mixtures thereof. Preferred are the alkenyl aromatic monomers such as styrene, $\alpha$-methyl styrene, vinyl toluene, alkyl substituted styrenes such as t-butyl styrene, etc., halogen substituted styrenes such as chlorostyrene, dichlorostyrene and the like.

The thermosettable resin/polydiene rubber mixtures of this invention, may be readily cured by exposure to ionizing radiation or by admixture of free radical yielding catalysts such as the well known peroxides, persulfates and the like. With catalysts the cure may be accelerated by heating up to 150°C or higher and also, if desired, by the addition of accelerating agents.

Reverse impact strength, uniform pigmentation, smooth surface and good paintability are all important characteristics which may be obtained with the compositions of this invention. Reverse impact is measured by subjecting a 5 inch diameter molded specimen to the impact of a ½ pound steel ball, 1½ inches in diameter, dropped from varying heights, in inches. The panel passes if there is no sign of cracking on the reverse side of the specimen after impact. The higher the height that passes the better the reverse impact strength. Desirably for certain automotive uses the specimen should pass eight inches of reverse impact, but for other purposes a lesser impact resistance is of value.

Surface smoothness can be measured by a Micro Recorder (manufactured by Micrometrical Manufacturing Co., Ann Arbor, Mich., Type RAE Recorder, Model S3) which in essence utilizes a small scribe to trace the surface contour and then records the surface "profile." From this tracing or record, the "profile" can be determined as the difference between the "peaks" and "valleys" in microinches. By low profile herein is meant a surface profile of about 300 microinch or less, measured as above; and a low profile resin is one which upon molding with glass fiber mat at a 25–35 percent glass level produces a smooth surface of less than about 300 microinch over an average 3 inch to 4 inch span.

Paintability may be evaluated by a water soak test in which the molded part is painted with an automotive enamel and then immersed for 240 hours in a water bath at 90°F. Any imperfections, usually in the form of paint blisters, constitutes failure. Uniformity of pigmentation is evaluated visually and non-uniform pigmentation is readily discernible to a skilled artisan.

The following non-limiting examples are presented to further illustrate the invention and the advantages thereof. All parts and percentages are by weight unless otherwise specified.

EXAMPLE 1

Resin compositions were prepared using a variety of unsaturated polydiene rubbers and a commercially available polyester resin (P-340, Rohm and Haas) which is proposed for and especially designed to produce a smooth molded surface. The polyester was essentially a 1:1 maleic anhydride/propylene glycol resin with some dipropylene glycol units as indicated by nuclear magnetic resonance analysis. For comparison, several thermoplastic resins were substituted for said rubbers.

The resin compositions were prepared to contain polyester, styrene and the additive in the respective proportions of 45/46/9 except for a control run which omitted the additive and where the ratio of polyester to styrene was 54/46. A molding composition was then prepared by mixing a hydrated kaolin clay in the proportion of 60 parts resin composition and 40 parts clay. To this was then added about 1 percent t-butyl peroctoate catalyst and 0.5 percent of a proprietary mold release agent (Zelec UN), both based on resin composition weight. This mixture was then molded with 30 percent continuous glass mat and a 20 mil veil glass mat on one side for 1–2 minutes at 150°C and about 300 psi. The results are shown in Table I.

TABLE I

| | Additive | Reverse Impact, Inches | Surface Micro-Inches |
|---|---|---|---|
| A | none | <3 | 300 |
| B | polymethyl methacrylate | <4 | 175 |
| C | polyvinyl chloride | 4 | 750 |
| D | polystyrene | 5 | 175 |
| E | polystyrene* | failed 4 | 220 |
| F | polybutadiene (a) | 10 | 145 |
| G | styrene/butadiene 48/52, random (b) | 7 | 175 |
| H | styrene/butadiene 25/75, block (c) | 6 | 145 |
| I | styrene/butadiene 25/75, random (d) | 7 | 145 |
| J | styrene/butadiene 60/40, block | 8 | 240 |
| K | (same as J)* | 15+ | 140 |
| L | styrene/butadiene 70/30, block | 6 | 240 |
| M | (same as L)* | 6 | 190 |
| N | S/B/S 20/60/20, block (g) | 10 | 180 |
| O | S/B/S 25/50/25, block (g) | 10 | 160 |
| P | B/S/B 33/33/33, block (g) | <5 | 240 |
| Q | B/S/B (similar to P) | 5 | — |
| R | B/S/B (same as Q)* | 10 | 284 |
| S | acrylonitrile/butadiene 20/80, random (e) | >10 | 180 |
| T | acrylonitrile/butadiene 32/68, random (f) | >10 | 150 |

*Added at 15% level
(a) Phillips Solprene 203;
(b) Solprene 303 (about 10% block);
(c) Solprene 1205;
(d) Solprene 1206;
(e) Goodyear N 902;
(f) Goodyear RCG 1592X;
(g) triblock polymer where S = styrene and B = butadiene.

Even though this polyesteresin was designed to give smooth surfaces, the unsaturated polydiene rubbers gave as good or better surfaces than the thermoplastic additives and in addition gave significant improvements in reverse impact. All the rubbers used herein had an inherent viscosity within the range of 0.3 to 2.0 deciliters/gram. The polybutadiene had a viscosity of 1.9 deciliters/gram.

EXAMPLE 2

A more general purpose isophthalic polyester resin was used in tests similar to that of Example 1. The resin was prepared with a mole ratio of isophthalic to maleic anhydride of 3 to 4 and the glycol was predominantly diethylene glycol with some ethylene glycol. Table II summarises the compositions and results.

With this resin (a more flexible, lower heat distortion resin), the initial surface was poorer than the previous polyester resin often having profiles as high as 2,500 but the initial impact was better. Even so, the styrene/butadiene block copolymer gave significant improvements in both properties and the composition's pigment uniformly when compared to polymethyl methacrylate, for example.

TABLE II

| Additive Type | Wt. % | Wt. Percent of PE | Wt. Percent of Sty. | Reverse Impact Inches | Surface Micro-Inches |
|---|---|---|---|---|---|
| none | 0 | 65 | 35 | 6 | >1000 |
| none | 0 | 55 | 45 | 4 | >1000 |
| polystyrene | 9 | 40 | 51 | 6 | 450 |
| polymethyl methacrylate | 9 | 40 | 51 | 6 | 775 |
| S/B 40/60, block (a) | 9 | 40 | 51 | 8 | 335 |
| S/B 40/60, block | 9 | 40 | 51 (b) | 8 | 450 |

TABLE II—Continued

| Additive | | Wt. Percent of | | Reverse Impact | Surface |
|---|---|---|---|---|---|
| Type | Wt. % | PE | Sty. | Inches | Micro-Inches |
| polystyrene | 15 | 33 | 52 | 7 | 600 |
| polymethyl methacrylate | 15 | 33 | 52 | 7 | 825 |
| S/B 40/60, block | 15 | 33 | 52 | >20 | 360 |

(a) inherent viscosity of 0.7 deciliters/gram
(b) monomer is 80/20 monochlorostyrene/styrene

EXAMPLE 3

Moldings were prepared as in the previous examples to evaluate the effect of concentration of rubber on impact and surface as well as other mechanical properties. The 40/60 styrene/butadiene block copolymer of Example 2 was used as well as a polybutadiene rubber. The unsaturated polyester (P-340) of Example 1 was used in these tests. Results are shown in Table III.

The upper limit on rubber composition is more a physical limitation due to viscosity, although mechanical properties also begin to fall off above about 15 percent rubber.

When clay is added to the system phase separation is inhibited and polydiene rubbers having viscosities as high as about 2 deciliters/gram may be used.

The effect of viscosity on reverse impact was also determined at a 9 percent level of rubber admixed with 46 percent styrene and 45 percent of P-340 polyester resin. The mixture was then combined with clay and glass fibers and molded as before.

| Rubber | Inherent Visc., deciliters/gm | Approx. Mol. Wt. | Reverse Impact Inches |
|---|---|---|---|
| 25/75 S/B copolymer | 0.17 | <5,000 | <4 |

TABLE III

| Weight Percent | | Reverse Impact, | Surface | Properties* | |
|---|---|---|---|---|---|
| P-340 Resin | Rubber | Inches | Micro-Inches | Rm. Temp. | 300°F |
| | S/B Block | | | | |
| 100 | 0 | <3 | 300 | 22.9/0.97 | 13.2/0.59 |
| 94 | 6 | 4 | 190 | 25.3/1.09 | 16.8/0.80 |
| 91 | 9 | 6 | 200 | 24.2/0.99 | 11.2/0.58 |
| 88 | 12 | 12 | 170 | 22.0/0.99 | 10.9/0.62 |
| 85 | 15 | >20 | 250 | 22.2/0.98 | 12.2/0.64 |
| | Polybutadiene** | | | | |
| 97 | 3 | 4 | 440 | — | — |
| 94 | 6 | 5 | 300 | — | — |
| 91 | 9 | 10 | 200 | — | — |
| | Polymethyl Methacrylate | | | | |
| 91 | 9 | <4 | 175 | 25.1/1.22 | 10.8/0.65 |

*Flexural strength × $10^3$ psi/Flexural Modulus × $10^{-6}$ psi
**Solprene 203

EXAMPLE 4

Both stability and molded properties are dependent on the inherent viscosity of the unsaturated polydiene rubber added. Rubbers with varying viscosity were mixed with an unsaturated polyester resin (P-340) and styrene in the proportions of about 45 parts of resin/46 parts of styrene/9 parts of rubber and stability of the mixtures observed.

| Rubber | Inherent Visc., deciliters/gm | Stability |
|---|---|---|
| Polybutadiene | 1.9 | phase separated |
| do. | 0.6 | stable |
| 40/60 S/B block | 1.3 | phase separated |
| do. | 0.5 | stable |
| acrylonitrile/butadiene* 32/68, random | 0.84 | stable |

* Goodyear RCG 1592X

| | Inherent Visc., deciliters/gm | Approx. Mol. Wt. | Reverse Impact Inches |
|---|---|---|---|
| 25/75 S/B copolymer | 0.24 | <10,000 | <4 |
| 25/75 S/B copolymer | 1.5 | — | 7 |
| Hycar CTBN(a) | 0.18 | ~2,000 | <4 |
| Ricon 100(b) | 0.1 | ~2,000 | <4 |
| Ricon 150(c) | 0.1 | ~2,000 | <4 |
| Polybutadiene | 1.9 | ~370,000 | 10 |
| Polybutadiene | 0.6 | ~35,000 | 6 |
| 40/60 S/B block copolymer | 0.5 | >15,000 | 8 |

(a) carboxyl terminated 80/20 polybutadiene/acrylonitrile
(b) formerly called Buton 100, an 80/20 B/S copolymer
(c) formerly called Buton 150, a polybutadiene Rubbers which have an inherent viscosity below about 0.3 deciliters per gram phase separate rapidly even in clay filled systems and give rise to an undesirable effect called mold scum. After a mold has been used one to three times with an unstable system, a polymeric layer builds upon the die and this layer or scum makes part removal very difficult and causes a poor surface finish. Three different rubbers having a viscosity of 0.14 to 0.18 deciliters/gram were all found to produce a very bad scum condition while other rubbers having viscosities of 0.5 to 0.94 did not.

EXAMPLE 5

Paintability, as determined by the water soak test, is also superior when a polydiene rubber is used in place of polymethyl methacrylate. Both additives were tested at a 9 percent level with 46 percent of styrene and 45 percent of P-340 resin. Clay and glass filled moldings were prepared as in Example 1 and tested.

| Additive | Reverse Impact, Inches | Properties at 300°F | Paint Soak Test |
|---|---|---|---|
| Polymethyl methacrylate | 3 | 10.8/0.65 | Failed |
| S/B 40/60, block | 9 | 15.1/0.80 | Passed |

The block copolymer was superior to polymethyl methacrylate in all three property areas.

EXAMPLE 6

To illustrate further the effectiveness of the styrene/butadiene block copolymers a series of block copolymers of varying composition at about the same inherent viscosity of 0.7 were tested at a 10 percent rubber level. The impact from 0 (i.e., 100 percent polybutadiene) to about 30/70 styrene/butadiene was static at about a reverse impact of 6 inches. From 30/70 to 50/50 styrene/butadiene the impact increased greatly to about 10 inches and then declined again to 6 inches at about 75/25. Thereafter the impact declined further as the composition approached 100 percent styrene (i.e., polystyrene).

In contrast to this, if polystyrene (inh. visc. 0.7) is blended with polybutadiene (inh. visc. 0.7) in varying proportions and the blend tested at the same additive level as above in a similar resin system, the best impact of 6 inches is obtained at 100 percent polybutadiene. Reverse impact decreases to 5 inches as the percent of polystyrene in the blend increases to 25/75 polystyrene/polybutadiene and thereafter remains at about 5 inches up to 100 percent polystyrene. The styrene/butadiene block copolymer provides reverse impact resistance not obtainable by merely blending homopolymers of styrene and of butadiene.

While blends of thermoplastics with polymers of conjugated dienes such as polybutadiene have little effect on reverse impact, blends of said thermoplastics with the preferred block copolymers are beneficial. For example, following the procedure of example 1 a mixture comprising 33.8 percent polyester resin (P340), 54.2 percent styrene, 6 percent block copolymer of butadiene/styrene (75/25; Solprene 1205) and 6 percent polystyrene was evaluated. The cured article had a reverse impact of 7 inches and a surface profile of about 180. This improvement can be compared to example 1H (Table I).

Any thermoplastic compatible with the resin system may be used. A variety of such materials are known and used to improve the surface profile. Typical thermoplastics include polyalkenylaromatic polymers such as polystyrene, polyalkyl methacrylates such as polymethylmethacrylate, polyvinyl esters such as polyvinyl acetate, polyolefins such as polyethylene, polyamides and a variety of copolymers of the above type monomers with each other and with other monomers such as acrylonitrile and the like. The proportion of thermoplastic plus block copolymer rubber should not exceed about 15 weight percent of the thermosettable composition and the proportion of block copolymer rubber should unexpected advantage of producing uniformly pigmented molded articles.

The benefits and advantages of the compositions of this invention are obtained without adversely affecting the mechanical properties such as flexural strength and modulus. As already indicated, the compositions may be combined with a variety of inert fillers such as clay, silica, $CaCO_3$, and other known fillers and with reinforcing additives such as glass fibers, asbestos, thermoplastic fibers such as nylon, polyvinyl alcohol and the like. The proportions of clay and fillers will vary widely depending on the thermosettable resin, polydiene rubber, viscosity of the mixture, ultimate properties desired in the molded part, etc. and are easily determined with little experimentation.

The properties of the compositions herein are especially valuable in the preparation of reinforced molded articles where high reverse impact strength is a prime property such as in the molding of automotive body and other parts, but the utility is not limited to this one area and includes many other areas such as construction materials, pipe, furniture, boats, and like areas. The compositions are of general utility in all the areas where unsaturated polyester and vinyl ester resins have been used. the mechanical properties such as flexural strength and modulus. Al already indicated, the compositions may be combined with a variety of inert fillers such as clay, silica, $CaCO_3$, and other known fillers and with reinforcing additives such as glass fibers, asbestos, thermoplastic fibers such as nylon, polyvinyl alcohol and the like. The proportions of clay and fillers will vary widely depending on the thermosettable resin, polydiene rubber, viscosity of the mixture, ultimate properties desired in the molded part, etc. and are easily determined with little experimentation.

The properties of the compositions herein are especially valuable in the preparation of reinforced molded articles where high reverse impact strength is a prime property such as in the molding of automotive body and other parts, but the utility is not limited to this one area and includes many other areas such as construction materials, pipe, furniture, boats, and like areas. The compositions are of general utility in all the areas where unsaturated polyester and vinyl ester resins have been used.

What is claimed is:

1. A stable, thermosettable compositiion suitable for preparing impact resistant reinforced plastic articles which comprises a mixture of about 85 to 95 weight percent of a polymerizable resin wherein said resin comprises about 25 to 70 weight percent of an unsaturated polyester of a dicarboxylic acid and a polyol and about 75 to 30 weight percent of a copolymerizable vinyl monomer, and about 15 to 5 weight percent of a polydiene rubber selected from the group consisting of (a) a homopolymer of a conjugated diene monomer or a copolymer of two or more conjugated diene monomers having an inherent viscosity of about 0.75 to 1.2 deciliters/gm and (b) copolymers of 30 to 80 weight percent of a conjugated diene and 70 to 20 weight percent of at least one other copolymerizable monomer selected from the group consisting of unsaturated nitrile monomers and alkenyl aromatic monomers wherein the copolymer has an inherent viscosity of about 0.3 to 1.2 deciliters/gm.

2. The composition of claim 1 wherein the viscosity of the copolymer is about 0.5 to 1.2 deciliters/gm.

3. The composition of claim 1 wherein the weight percent of said diene in the copolymer ranges from 40 to 70 percent.

4. The composition of claim 3 wherein said copolymer is a copolymer of 40 to 70 weight percent butadiene and 60 to 30 weight percent styrene.

5. The composition of claim 4 wherein said copolymer is a block copolymer.

6. The composition of claim 1 further containing an inert reinforcing material.

7. The composition of claim 1 further containing at least 15 parts of an inert filler per 100 parts of said resin and polydiene rubber.

8. A thermoset resin prepared by curing the composition of claim 1.

9. A stable, thermosettable composition suitable for preparing impact resistant reinforced plastic articles which comprises a mixture of about 85 to 95 weight percent of a polymerizable resin, wherein said resin comprises about 25 to 70 weight percent of an unsaturated polyester of a dicarboxylic acid and a polyol and about 75 to 30 weight percent of a copolymerizable vinyl monomer; about 15 to 5 weight percent of a polydiene rubber selected from the group consisting of (a) a homopolymer of a conjugated diene monomer or a copolymer of two or more conjugated diene monomers having an inherent viscosity of about 0.75 to 2 deciliters/gm. and (b) copolymers of 30 to 80 weight percent of a conjugated diene and 70 to 20 weight percent of at least one other copolymerizable monomer selected from the group consisting of unsaturated nitrile monomers and alkenyl aromatic monomers wherein the copolymer has an inherent viscosity of about 0.3 to 2 deciliters/gm; and at least about 15 parts of an inert filler per 100 parts of said resin and rubber.

10. The composition of claim 9 wherein said polydiene rubber is a copolymer of about 40 to 70 weight percent of said diene and about 60 to 30 weight percent of said copolymerizable monomer.

11. The composition of claim 9 wherein said polydiene rubber is a copolymer of about 40 to 70 weight percent butadiene and 60 to 30 weight percent styrene.

12. The composition of claim 11 wherein said copolymer is a block copolymer.

13. The composition of claim 9 where the viscosity of the copolymer is about 0.5 to 2 deciliters/gm.

14. The composition of claim 9 further containing an inert reinforcing material.

15. A thermoset resin prepared by curing the composition of claim 9.

16. A stable, thermosettable composition suitable for preparing impact resistant reinforced plastic articles which comprises a mixture of about 85 to 95 weight percent of a polymerizable resin wherein said resin comprises about 25 to 70 weight percent of an unsaturated polyester of a dicarboxylic acid and polyol and about 75 to 30 weight percent of a copolymerizable vinyl monomer, and about 15 to 5 weight percent of a block copolymer of 40 to 70 weight percent of a conjugated diene and about 60 to 30 weight percent of an alkenyl aromatic monomer, wherein said copolymer has an inherent viscosity of about 0.3 to 1.2 deciliters/gm.

17. The composition of claim 16 wherein said block copolymer is a butadiene/styrene copolymer.

18. The composition of claim 16 wherein the inherent viscosity is about 0.5 to 1.2 deciliters/gm.

19. The composition of claim 16 further containing an inert reinforcing material.

20. The composition of claim 16 further containing at least 15 parts of an inert filler per 100 parts of said resin and polydiene rubber.

21. A thermoset resin prepared by curing the composition of claim 16.

22. The composition of claim 16 further comprising a thermoplastic polymer wherein the combined weight of said thermoplastic and said block copolymer comprises about 5 to 15 weight percent of said thermosettable composition and provided that said block copolymer comprises at least 5 weight percent of said composition.

23. The composition of claim 22 wherein said thermoplastic is polystyrene or polymethylmethacrylate.

24. A stable, thermosettable composition suitable for preparing impact resistant reinforced plastic articles which comprises a mixture of about 85 to 95 weight percent of a polymerizable resin wherein said resin comprises about 25 to 70 weight percent of an unsaturated polyester of a dicarboxylic acid and polyol and about 75 to 30 weight percent of a copolymerizable vinyl monomer; about 15 to 5 weight percent of a block copolymer of 40 to 70 weight percent of a conjugated diene and about 60 to 30 weight percent of an alkenyl aromatic monomer, wherein said copolymer has an inherent viscosity of about 0.3 to 2 deciliters/gm; and at least about 15 parts of an inert filler per 100 parts of said resin and said block copolymer.

25. The composition of claim 24 wherein said block copolymer is a butadiene/styrene copolymer.

26. The composition of claim 24 wherein the inherent viscosity is about 0.5 to 2 deciliters/gm.

27. The composition of claim 24 further containing an inert reinforcing material.

28. The composition of claim 24 further comprising a thermoplastic polymer wherein the combined weight of said thermoplastic and said block copolymer comprises about 5 to 15 weight percent of said thermosettable composition and provided that said block copolymer comprises at least 5 weight percent of said composition.

29. The composition of claim 28 wherein said thermoplastic is polystyrene or polymethylmethacrylate.

30. A thermoset resin prepared by curing the composition of claim 24.

* * * * *

UNITED STATES PATENT OFFICE
CERTIFICATE OF CORRECTION

Patent No. 3,857,812                               Dated December 31, 1974

Inventor(s) R. M. Nowak and Thomas O. Ginter

It is certified that error appears in the above-identified patent and that said Letters Patent are hereby corrected as shown below:

Column 1, line 51, "metharcrylate" should read --methacrylate--;

Column 6, line 35, "polyesteresin" should read -- polyester resin --;

Signed and Sealed this eighteenth Day of November 1975

[SEAL]

Attest:

RUTH C. MASON
Attesting Officer

C. MARSHALL DANN
Commissioner of Patents and Trademarks